United States Patent
Knight

(10) Patent No.: US 10,994,944 B1
(45) Date of Patent: May 4, 2021

(54) TUNNEL CURTAIN

(71) Applicant: Hayes-Ivy Manufacturing, Inc., Ft. Lauderdale, FL (US)

(72) Inventor: Peter H Knight, Ft. Lauderdale, FL (US)

(73) Assignee: Hayes-Ivy Manufacturing, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/867,474

(22) Filed: May 5, 2020

Related U.S. Application Data

(60) Provisional application No. 62/982,735, filed on Feb. 27, 2020.

(51) Int. Cl.
| | |
|---|---|
| *B65G 43/10* | (2006.01) |
| *B65G 15/30* | (2006.01) |
| *B65G 43/00* | (2006.01) |
| *B65G 21/00* | (2006.01) |
| *B65G 43/08* | (2006.01) |

(52) U.S. Cl.
CPC ............ *B65G 43/10* (2013.01); *B65G 15/30* (2013.01); *B65G 21/00* (2013.01); *B65G 43/00* (2013.01); *B65G 43/08* (2013.01)

(58) Field of Classification Search
CPC ........ B65G 43/08; B65G 43/00; B65G 43/10; B65G 13/30; B65G 21/00; B65G 21/20; B65G 21/2063; B65G 21/209
See application file for complete search history.

(56) References Cited

U.S. PATENT DOCUMENTS

| | | | | |
|---|---|---|---|---|
| 3,565,237 A | * | 2/1971 | Strydom | A24C 5/35 198/572 |
| 3,618,745 A | * | 11/1971 | Dominici | B65G 17/123 198/370.05 |
| 4,718,538 A | * | 1/1988 | Low | B65B 23/12 198/431 |
| 4,797,301 A | * | 1/1989 | Ardley | A01C 1/08 427/8 |
| 2004/0123566 A1 | * | 7/2004 | Limousin | B65B 53/063 53/442 |
| 2007/0056388 A1 | * | 3/2007 | Henry | G01N 1/44 73/863.12 |
| 2015/0101639 A1 | * | 4/2015 | Heppner | A47L 15/24 134/18 |
| 2019/0129059 A1 | * | 5/2019 | Connelly | G01N 23/046 |
| 2021/0032051 A1 | * | 2/2021 | Wilson | B65G 65/005 |

* cited by examiner

*Primary Examiner* — Mark A Deuble
(74) *Attorney, Agent, or Firm* — Inspired Idea Solutions Law Firm

(57) ABSTRACT

A tunnel may have a housing with an entrance, an exit, and a pathway extending from the entrance to the exit through the housing. The tunnel may be used for performing operations, such as cleaning operations within the tunnel. A conveyor may be configured to move articles through the housing along the pathway. One or more detectors may be configured at discrete locations along the pathway. One or more curtains may be configured between the entrance and the exit of the housing to partition the pathway into two or more segments. One or more sensors may be configured in each curtain. The one or more sensors may be detectable by the one or more detectors to determine the presence, position, orientation, or other characteristic of each curtain.

20 Claims, 2 Drawing Sheets

TUNNEL CURTAIN

FIELD

The present disclosure generally relates to tunnel curtains, and more particularly to operating a tunnel based on the presence of a tunnel curtain.

BACKGROUND

Tunnels may be used for passing articles through, such as during a washing operation (e.g., wash ware such as crockery, pots, glasses, cutlery and other articles may be passed through a tunnel forming a warewasher). Such tunnels may be used in commercial applications and may further be used in combination with a conveyor which transports articles through the tunnel (e.g., vehicles may be conveyed through a tunnel forming a car wash). Tunnels may be used for inspection of items including luggage and packages passing through an x-ray inspection tunnel.

Curtains have been used in tunnels to create a partition between different operations performed within the tunnel, or to partition the entrance and/or exit of the tunnel. Such use has the effects including improving performance of the operations performed within the tunnel, increasing safety of those around the tunnel, and/or optimizing performance. Yet, the prior art lacks the ability to ensure the adequate installation, placement, and/or orientation of curtains before tunnel use.

Therefore, it would be desirable to optimize curtain placement and/or orientation within the tunnel in order to improve performance and safety of the operations performed within the tunnel.

SUMMARY

A tunnel comprises a housing having an entrance, an exit, and a pathway extending from the entrance to the exit through the housing; one or more detectors configured at discrete locations along the pathway; a conveyor for moving articles through the housing along the pathway; one or more curtains configured between the entrance and the exit; and one or more sensors configured in the one or more curtains, the one or more detectors detecting a signal of the one or more sensors.

A curtain may be configured between an entrance and an exit of a tunnel, the tunnel having a housing defining a pathway extending from the entrance to the exit, the housing having one or more detectors configured at discrete locations along the pathway and a conveyor for moving articles through the housing along the pathway, the curtain comprises one or more sensors configured in the curtain, the one or more sensors detectable by the one or more detectors.

In accordance with a method of operating a tunnel having an entrance, an exit, and a housing defining a pathway extending from the entrance to the exit through the housing, a conveyor for moving articles through the housing along the pathway, and one or more curtains configured between the entrance and the exit, the method includes configuring one or more detectors at discrete locations along the pathway; configuring one or more sensors in the one or more curtains; and detecting a signal of the one or more sensors in a corresponding one of the one or more curtains with the one or more detectors.

BRIEF DESCRIPTION OF THE DRAWINGS

Various aspects and advantages will become apparent upon review of the following detailed description and upon reference to the drawings in which.

DETAILED DESCRIPTION

The following disclosure includes a method and apparatus for operating a tunnel based on the orientation or other characteristic of a curtain.

Figure 1:
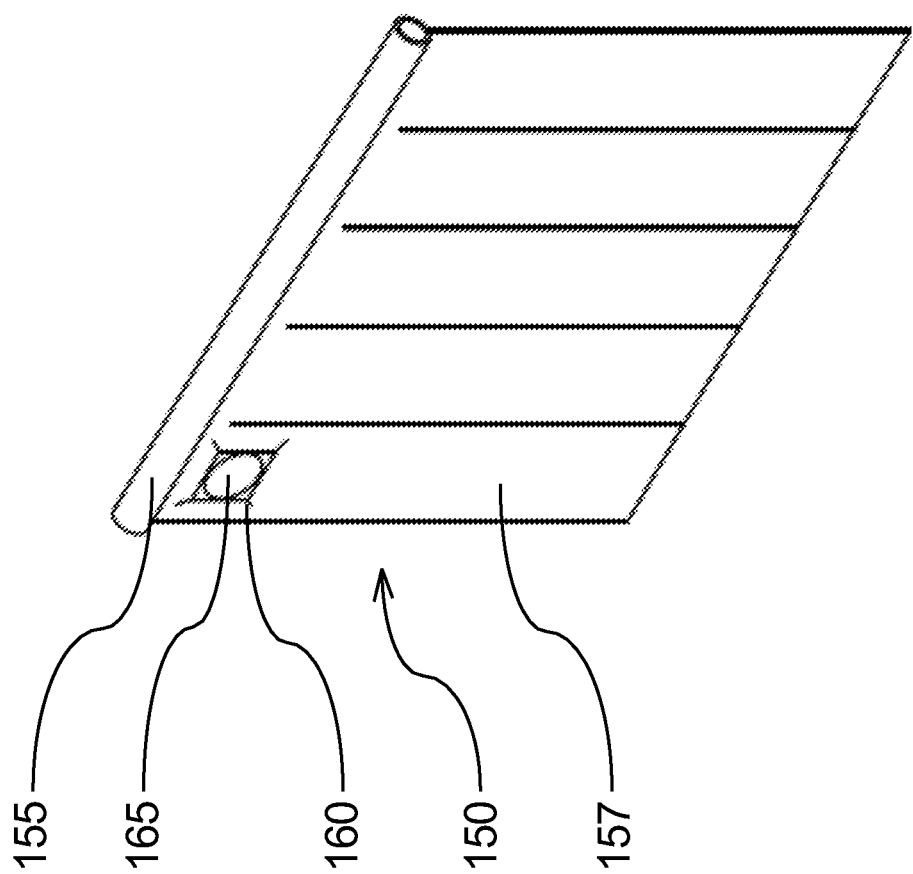
FIG. 1 illustrates an isometric view of a curtain.

FIG. 1 illustrates a curtain 150. Curtain 150 may be configured to be insertable into a tunnel (e.g., tunnel 200 of FIG. 2). Curtain 150 may be dimensioned appropriately to create a partition during use. Curtain 150 may extend from about one side of the tunnel to about an opposing side. Curtain 150 may extend substantially from a top of the tunnel to a bottom thereof. Curtain 150 may be sized to extend less than the distance between opposing sides, and/or less than the distance between the top and bottom of the tunnel. Curtain 150 may have a particular thickness to enable flexibility during use (e.g., the passage or movement of articles through curtain 150), to insulate (e.g., to preserve a temperature level beyond curtain 150), or to add durability to curtain 150 (e.g., to protect a sensor 265 in curtain 150).

Curtain 150 may be formed to include a top portion 155 and a bottom portion 157. Top portion 155 may be configured to enable curtain 150 to be secured within the tunnel (e.g., tunnel 200 of FIG. 2). Bottom portion 157 may be formed by a series of separate panels arranged in proximity to each other (e.g., as exemplified in FIG. 1). The series of separate panels may be independently movable with respect to each other and/or with respect to top portion 155. Bottom portion 157 may be formed of a single panel of material.

Top and bottom portions 155, 157 may be formed separately or together of a particular material. The material used for top and bottom portions 155, 157 may be selected to enable curtain 150 to undergo deflection without breaking and/or tearing (e.g., such as plastic, rubber, composite, or other suitable material), to insulate, or add durability. The material may be selected to withstand operations performed within the tunnel (e.g., water jets, brushing, or other mechanical motion). The material may be selected to withstand an environment that exists within the tunnel (e.g., high temperature, high chemical content, etc.). The material may be selected to enable transmission through the material (e.g., the passage of light, the passage of radio waves, or other forms of transmission). The material may be selected to optimize viewing into the tunnel (e.g., transparent, translucent, or opaque material). Alternatively, the material may be selected to block transmission of frequencies of light, frequencies of emissions and/or radiation through the material.

Curtain 150 may include a pocket 160 for containing one or more sensors 165. Pocket 160 may be formed by attaching a separate piece of material over the one or more sensors 165 (e.g., gluing or otherwise sealing the one or more sensors 165 within pocket 160, forming a sealed pocket). Pocket 160 may be formed in curtain 150 during manufacture of curtain 150 (e.g., such as by injection molding, and afterward inserting the one or more sensors 165 into pocket 160). Pocket 160 may be formed by cutting an opening in curtain 150. The one or more sensors 165 may be sealed within pocket 160 so that the one or more sensors 165 are protected from operations performed within the tunnel, the environment within the tunnel, or other conditions which might otherwise harm or adversely affect the operation of the one or more sensors.

Pocket 160 may be positioned so as not to obstruct the other features of curtain 150. Pocket 160 may be positioned so that any sensors positioned within pocket 160 will not be struck by an article passing or moving through curtain 150. Pocket 160 may be positioned so that any sensors positioned within pocket 160 will be struck by an article passing or moving through curtain 150. Pocket 160 may be located in an upper corner of curtain 150 (e.g., upper left corner as exemplified in FIG. 1). Two or more pockets 160 may be configured in curtain 150 (e.g., 2, 3, 4, 5, 6 or more pockets), with pockets 160 having one or more similar or different sensors.

"Sensor(s)" as used in the present disclosure may be interpreted broadly and may encompass a vast array of systems including microprocessors, sensors, communication systems, magnets, and other means for electronic, magnetic, or other communication. "Sensor(s)" may include acoustic, sound, and/or vibration sensing devices (e.g., geophone, hydrophone, microphone, seismometer, sound locator, lace sensing and/or ultrasonic sensing devices). "Sensor(s)" may include electric current, electric potential, magnetic, and/or radio sensing devices (e.g., current, Daly detector, electroscope, electron multiplier, Faraday cup, galvanometer, Hall effect, Hall probe, hyperspectral, magnetic anomaly detector, magnetoresistance, MEMS magnetic field, metal detector, planar Hall, radio direction finder, transducer, and/or voltage detection sensing devices).

"Sensor(s)" may include object, position, angle, displacement, distance, speed, and/or acceleration sensing devices (e.g., capacitive displacement, capacitive, displacement receiver, goniometer, potentiometer, flex/stretch, gyroscopic, shock/impact, shock data logger, inclinometer/clinometer, liquid capacitive inclinometer, incremental encoder, integrated circuit piezoelectric, laser rangefinder, laser surface velocimeter, LIDAR (light imaging detection and ranging), linear encoder, linear/rotary variable differential transformer, odometer, photoelectric, piezoelectric accelerometer, position, pitot tube, pitometer log, piezo, angular rate, rotary encoder, sonar, speedometer, selsyn, sun sensing, tilt, tachometer, ultrasonic thickness gauge, ultra-wideband radar, variable reluctance, velocity receiver and/or wheel speed sensors).

"Sensor(s)" may include optical, light, imaging, and/or photon sensing devices (e.g., active pixel, catadioptric, complementary metal-oxide semiconductor, colorimeter, electro-optical, Fabry-Perot interferometer, flame, infrared, light-addressable potentiometric, machine vision, optical position, thermopile laser, photodetector, photodiode, photomultiplier tube, phototransistor, photoelectric, photoionization detector, photomultiplier, photoresistor, photoswitch, phototube, scintillometer, staring array/focal-plane array, structured-light 3D scanning, transition-edge, video sensing, visible light photon counter, and/or wavefront sensing devices). "Sensor(s)" may include pressure sensing devices (e.g., barograph, barometer, boost gauge, bourdon gauge, electromechanical film, hot filament ionization gauge, ionization gauge, McLeod gauge, oscillating U-tube, permanent downhole gauge, piezometer, pirani gauge, tactile, time pressure gauge, pressure gauge, and/or pressure sensing devices). "Sensor(s)" may include proximity and/or presence sensing devices (e.g., Doppler radar, motion detector, occupancy, proximity, passive infrared, reed switch, stud finder, triangulation, touch switch, and/or wired glove sensing devices).

"Sensor(s)" may include MEMS (microelectromechanical systems), NEMS nanoelectromechanical systems), nanosensors, smartdust, SAR (synthetic aperture radar), RFID (radio frequency identification), and/or wireless interface technology (e.g., Wi-Fi, Bluetooth, etc.).

Figure 2:
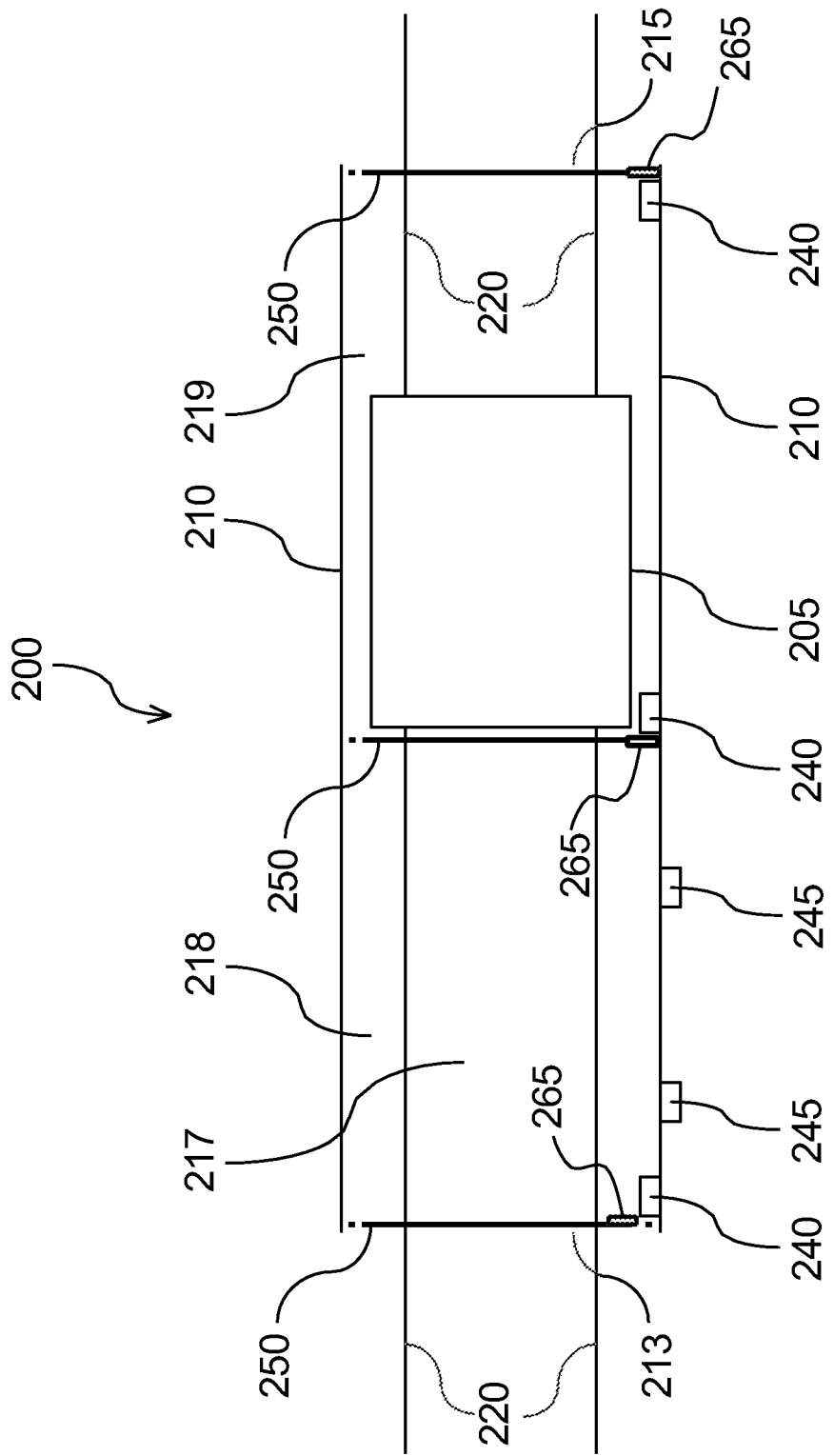
FIG. 2 illustrates interior features of a tunnel.

Other aspects and features of the one or more sensors 165 will be apparent after further discussion with regard to FIG. 2. Nevertheless, a person of ordinary skill in the art will appreciate that additional variations to curtain 150 are possible and contemplated (e.g., such as curtains of substantially non-rectangular shape, and so forth).

FIG. 2 illustrates a tunnel 200. Tunnel 200 may be formed by a housing 210 having an entrance 213, an exit 215, and a pathway 217 therethrough. Housing 210 may be substantially sealed except for entrance 213 and exit 215. Pathway 217 may be configured to be substantially linear. Pathway 217 may be substantially nonlinear.

A conveyor 220 may extend through tunnel 200 to enable the conveyance, transportation, or movement of articles through tunnel 200. Conveyor 220 may extend a distance beyond entrance 213 (e.g., to enable placement of articles on conveyor 220 prior to passing through entrance 213). Conveyor 220 may extend the entire distance through tunnel 200 (e.g., as exemplified in FIG. 2). Conveyor 220 may extend less than the entire distance through tunnel 200. Conveyor 220 may extend a distance beyond exit 215 (e.g., to enable retrieval of articles from conveyor 220 after passing through exit 215). Conveyor 220 may be configured to be substantially similar in shape and dimension to pathway 217 (e.g., extending substantially linearly).

As suggested above, an article 205 may be placed on conveyor 220, may be passed along pathway 217 through housing 210, and further may be retrieved. Article 205 may be passed unidirectionally along pathway 217, conveyor 220 or both. Article 205 may be passed bidirectionally (e.g., from entrance 213 to exit 215 and/or from exit 215 to entrance 213). Conveyor 220 may convey one article at a time. Conveyor may convey two or more articles at a time (e.g., 2, 3, 4, 5, 10, 20, 30, 100, 200, 300, 1000 or more articles).

In general, it is understood that article 205 may represent any article which would benefit from passing through tunnel 200 (i.e. would benefit from undergoing any process employed in tunnel 200). Article 205 may represent a single article to be passed through tunnel 200 (e.g., such as an automobile passing through tunnel 200 to be washed). Article 205 may represent an article carrier configured to carry one or more articles through tunnel 200 (e.g., such as a wash tray configured to carry wash ware such as crockery, pots, glasses, cutlery and so forth to be washed). Article 205 may represent packages passing through an inspection tunnel (e.g. baggage to be inspected prior to passing a security screening). Article 205 may represent packages passing through a treatment tunnel (e.g. packages to be treated prior to handling by personnel). Article 205 may be a food item to be inspected or treated in tunnel 200.

A person of ordinary skill in the art will appreciate that various operations, or treatments, may be performed within tunnel 200. Mechanical operations may be performed in tunnel 200 (e.g., such as spraying, scrubbing, scraping, cutting, blasting, shearing and so forth). Chemical operations may be performed in tunnel 200 (e.g., such as synthesis reactions, decomposition reactions, single replacement reactions, multiple replacement reactions and so forth). Heat operations may be performed in tunnel 200 (e.g., such as heating, soaking, cooling, hardening, case hardening, tempering, annealing, normalizing, and so forth). Magnetic operations may be performed in tunnel 200 (e.g., such as static magnetic field operations, electrically charged magnetic operations, and so forth). Radiation operations may be performed in tunnel 200 (e.g., such as alpha radiation, beta radiation, gamma radiation, x radiation, microwave radiation, radiofrequency radiation, infrared radiation, ultraviolet radiation, and so forth).

Tunnel 200 may have one or more detectors 240 positioned on housing 210 (e.g., at discrete locations along pathway 217). One detector 240 may be positioned in housing 210 (e.g., on a sidewall of housing 210 as exemplified in FIG. 2). One detector 245 may be positioned outside housing 210. Two or more detectors 240, 245 may be positioned adjacent to housing 210 (e.g., 2, 3, 4, 5, 6, 7, 8, 9, 10, or more detectors). While not shown, in is understood that detectors 240, 245 may be configured to receive power from a power source (e.g., such as a battery), and further that detectors 240, 245 may be configured to communicate with a microcontroller which is capable of receiving signals from detectors 240, 245, interpreting the signals from detectors 240, 245, and performing operations based on the received signals. Where appropriate, detectors 240, 245 may be protected within a cage or sealed enclosure to protect the detectors (e.g., from being contacted by an article, from moisture, from excessive heat or chemicals, or any other protection helpful to keep the detector in good working order).

Tunnel 200 may have one or more curtains 250 positioned along pathway 217 (e.g., curtains 250 may include one or more of the characteristics of curtains 150 as described with reference to FIG. 1). A curtain 250 may be positioned at entrance 213. A curtain 250 may be positioned at exit 215. A curtain 250 may be positioned at any other discrete location between entrance 213 and exit 215. Two curtains may be configured to substantially enclose pathway 217 (i.e., one curtain 250 at entrance 213 and one curtain 250 at exit 215). One curtain 250 may be positioned within housing 210 to bifurcate, or partition, pathway 217 into two separate zones or segments 218, 219. Two or more curtains 250 (e.g., 2, 3, 4, 5, 7, 8, 9, 10, or any number "N" of curtains) may be positioned within housing 210 to divide, or partition, pathway 217 into three or more separate segments (e.g., N−1 segments inside the tunnel 200 where a curtain is at the entrance 213 and exit 215 of the tunnel 200). Thus, similar or different operations may be utilized in segments 218, 219, and a tunnel 200 may be designed with the appropriate number of curtains and segments to accomplish a desired transformation, inspection, and/or treatment of an article.

The orientation (e.g., presence, placement, proximity and/or position) of the one or more curtains 250 may be significant to the overall capability, performance, or optimization of tunnel 200 to accomplish each operation. Thus, detectors 240, 245 may be configured to detect the orientation of the one or more curtains 250 (e.g., of the one or more sensors 265), independently or collectively, to ensure that operations performed in segments 218, 219 are accomplished satisfactorily. Detectors 240 may be positioned such that a corresponding curtain 250, or a sensor 265 in curtain 250 (e.g., sensor 165 of FIG. 1), must be located within a specified distance to the detector 240 (e.g., such that tunnel 200 and/or conveyor 220 may not operate when detector 240 does not detect the presence of curtain 250 or the sensor). Detectors 240, 245 may be positioned to detect the one or more sensors 265 at any range (e.g., with no precise distance requirement). A single detector 240, or 245, may be configured to detect the orientation of two or more curtains (e.g., as many curtains as are placed within tunnel 200). Two detectors 240, and/or 245, may be configured to detect the orientation of two or more curtains and/or sensors 265.

In some tunnels and systems with tunnels it may be possible to insert a curtain incorrectly. A curtain may be formed and configured to allow passage of articles through the curtain in one direction, and may resist passage of articles in the opposite direction. The placement of the sensor may allow an indication (e.g., via signals) when the curtain is installed backwards, or is not present in the tunnel system.

Various ways of detecting the presence of the one or more sensors 265 in the curtain may be converted to a signal by each sensor, may be communicated to one or more detectors 240, 245, whether instantaneously or incrementally, and such signal may be received by the one or more detectors and passed to a microcontroller which regulates the operation of the segments 218, 219 of tunnel 200, whether individually or collectively. A broken or missing curtain may result in the microcontroller stopping operation in tunnel 200 and/or conveyor 220 for any segment adjacent to the broken curtain, and/or stopping operation until the broken or missing curtain is repaired or replaced. Operation in one or both of segments 218, 219 along pathway 217 may be modified based on a sensed condition as sensed by a sensor embedded in curtain 250. Further, operation may be stopped, slowed, delayed, reversed, or otherwise modified based on signals received by the one or more detectors, 240, 245, or based on signals transmitted by the one or more sensors 265. Thus, curtains, with embedded sensors 265, may serve to provide, transmit, or relay signals to help regulate the operation of tunnel 200. Operation may continue in a tunnel 200 in some situations and an alert may result from a missing or improperly installed curtain (e.g. a light, sound, message, or transmission which may be shown at the tunnel or at a remote location or transmitted to a remote device, wireless device, or other device).

Other aspects will be apparent to those skilled in the art from consideration of the specification and practice disclosed herein. It is intended, therefore, that the specification and illustrated figures be considered as examples only.

What is claimed is:

1. A tunnel comprising:
   a housing having an entrance, an exit, and a pathway extending from the entrance to the exit through the housing;
   one or more detectors configured at discrete locations along the pathway;
   a conveyor for moving articles through the housing along the pathway;
   one or more curtains configured between the entrance and the exit; and
   one or more sensors configured in the one or more curtains, the one or more detectors detecting a signal of the one or more sensors.

2. The tunnel of claim 1, wherein the conveyor extends beyond the housing.

3. The tunnel of claim 1, wherein the one or more curtains includes a first curtain at the entrance and a second curtain at the exit.

4. The tunnel of claim 1, wherein the one or more curtains includes a third curtain positioned at a discrete location between the entrance and the exit to partition the pathway into two or more segments.

5. The tunnel of claim 4, wherein the one or more sensors sense a position or orientation of a corresponding one of the one or more curtains, and wherein the one or more sensors relay the signal to the one or more detectors to indicate the position or orientation.

6. The tunnel of claim 4, wherein the one or more sensors sense an operation or environment within a corresponding segment, and wherein the one or more sensors relay the signal to the one or more detectors to indicate the operation or environment.

7. A curtain configured between an entrance and an exit of a tunnel, the tunnel having a housing defining a pathway extending from the entrance to the exit, the housing having one or more detectors configured at discrete locations along the pathway and a conveyor for moving articles through the housing along the pathway, the curtain comprising:
one or more sensors configured in the curtain, the one or more sensors detectable by the one or more detectors.

8. The curtain of claim 7, wherein the pathway and conveyor extend linearly.

9. The curtain of claim 7, wherein the curtain includes a pocket, and wherein the pocket includes the one or more sensors.

10. The curtain of claim 9, wherein the pocket includes a sealed pocket.

11. The curtain of claim 7, wherein the curtain extends from about one side of the housing to about an opposing side.

12. A method of operating a tunnel having an entrance, an exit, and a housing defining a pathway extending from the entrance to the exit through the housing, a conveyor for moving articles through the housing along the pathway, and one or more curtains configured between the entrance and the exit, the method comprising:
configuring one or more detectors at discrete locations along the pathway;
configuring one or more sensors in the one or more curtains; and
detecting a signal of the one or more sensors in a corresponding one of the one or more curtains with the one or more detectors.

13. The method of claim 12, further comprising determining an operation of the tunnel based on the signal detected from the one or more sensors.

14. The method of claim 13, wherein the operation of the tunnel includes one or more of mechanical, chemical, heat, magnetic, and radiation treatments.

15. The method of claim 12, wherein the one or more curtains includes a curtain positioned at a discrete location between the entrance and the exit to partition the tunnel into two or more segments.

16. The method of claim 15, wherein the one or more sensors sense a position or orientation of a corresponding one of the one or more curtains, and wherein the one or more sensors relay the signal to the one or more detectors to indicate the position or orientation.

17. The method of claim 15, wherein the one or more sensors sense an operation or environment within a corresponding segment, and wherein the one or more sensors relay the signal to the one or more detectors to indicate the operation or environment.

18. The method of claim 15, further comprising determining an operation of the two or more segments based on the signal detected from the one or more sensors.

19. The method of claim 18, wherein the operation of the two or more segments includes one or more of an inspection, treatment, and transformation operation, individually or collectively.

20. The method of claim 12, further comprising transporting the articles linearly through the tunnel.

* * * * *